United States Patent [19]

Argy et al.

[11] Patent Number: 4,660,861
[45] Date of Patent: Apr. 28, 1987

[54] HEAT INSULATING MEANS FOR PIPING SUBJECTED TO THERMAL, HYDROSTATIC AND MECHANICAL STRESSES, POSITIONING THEREOF AND PROCESSES FOR FORMING SAID INSULATING MEANS

[75] Inventors: Gilles Argy, La Queue En Yvelines; Michel M. Grapin, Le Chesnay; Philippe Marchal, Lagny S/Marne, all of France

[73] Assignee: Hutchinson S.A., Paris, France

[21] Appl. No.: 687,138

[22] Filed: Dec. 28, 1984

[30] Foreign Application Priority Data

Dec. 28, 1983 [FR] France .................... 83 20911

[51] Int. Cl.$^4$ .................................. F16L 59/16
[52] U.S. Cl. .................................... 285/45; 285/47; 285/381; 285/915; 285/286; 138/149
[58] Field of Search .............. 285/45, 47, 48, 53, 285/286, 381, 904, 915; 138/149; 156/211, 215

[56] References Cited

U.S. PATENT DOCUMENTS

| | | | |
|---|---|---|---|
| 1,969,374 | 8/1934 | Kleffel | 138/149 |
| 2,405,330 | 8/1946 | Ryder | 156/215 |
| 2,890,739 | 6/1959 | Haines | 156/215 |
| 3,117,902 | 1/1964 | Holzheimer | 156/215 |
| 3,535,198 | 10/1970 | Bloom | 156/211 |
| 3,557,840 | 1/1971 | Maybee | 138/149 |
| 3,563,825 | 2/1971 | Segura | 156/215 |
| 3,665,968 | 5/1972 | De Putter | 138/149 |
| 3,685,546 | 8/1972 | Sigmund | 285/47 |
| 3,728,187 | 4/1973 | Martin | 138/149 |
| 3,744,823 | 7/1973 | Muir | 285/47 |
| 3,804,438 | 4/1974 | Humphries | 285/47 |
| 4,019,761 | 4/1977 | Heidemann | 285/381 |
| 4,022,248 | 5/1977 | Hepner | 156/215 |
| 4,139,024 | 2/1979 | Adorjan | 138/147 |
| 4,225,307 | 9/1980 | Magera | 285/47 |
| 4,287,245 | 9/1981 | Kikuini | 138/149 |
| 4,351,365 | 9/1982 | Bauermeister | 138/149 |
| 4,371,197 | 2/1983 | Chabrier | 285/47 |
| 4,391,924 | 7/1983 | Uram | 521/107 |
| 4,417,603 | 11/1983 | Argy | 138/149 |

FOREIGN PATENT DOCUMENTS

| | | | |
|---|---|---|---|
| 622947 | 6/1961 | Canada | 156/215 |
| 2333933 | 1/1974 | Fed. Rep. of Germany | 285/47 |
| 2900924 | 7/1980 | Fed. Rep. of Germany | 285/47 |
| 2538077 | 6/1984 | France | 285/47 |
| 2027158 | 2/1980 | United Kingdom | 285/47 |

Primary Examiner—Cornelius J. Husar
Assistant Examiner—Eric K. Nicholson
Attorney, Agent, or Firm—Oblon, Fisher, Spivak, McClelland & Maier

[57] ABSTRACT

The present invention relates to improvements made to heat insulating means for piping subjected to high thermal, hydrostatic and mechanical stresses.

The new insulating means comprises a plurality of sectors or layers made from a lacunal insulating material enclosing air, which sectors or layers are bonded together by sheets or layers of elastomer, and having undergone curing at a temperature less than or equal to 120° C.

13 Claims, 8 Drawing Figures

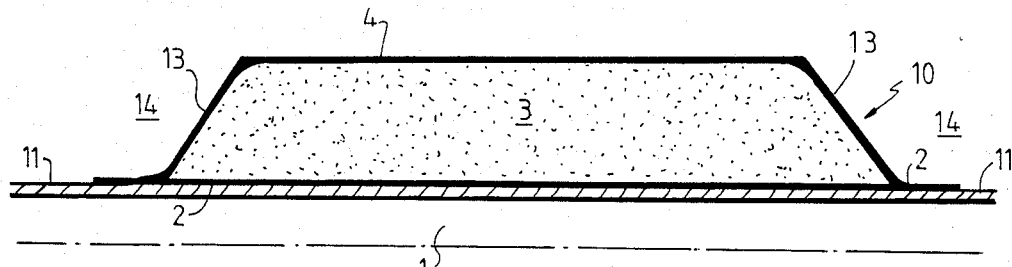
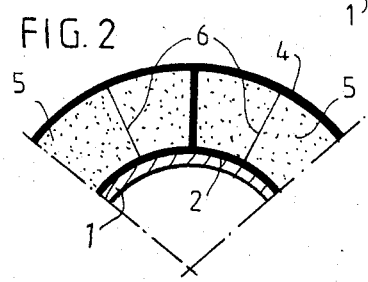
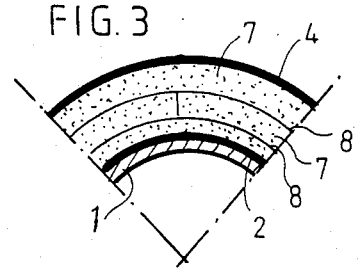
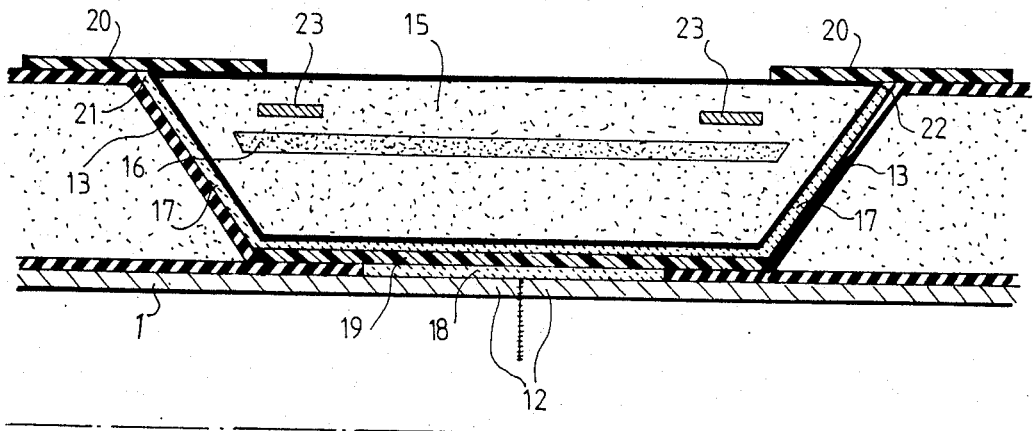
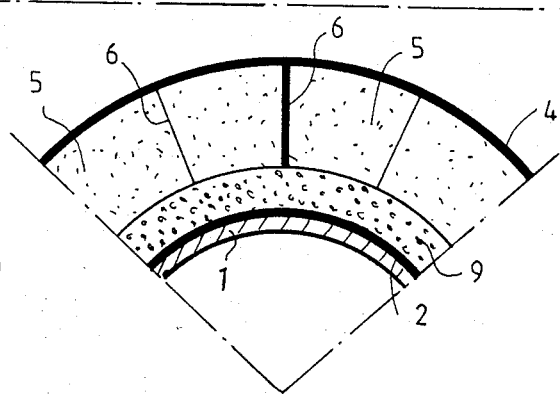

HEAT INSULATING MEANS FOR PIPING SUBJECTED TO THERMAL, HYDROSTATIC AND MECHANICAL STRESSES, POSITIONING THEREOF AND PROCESSES FOR FORMING SAID INSULATING MEANS

BACKGROUND OF THE INVENTION

1. Field of the Invention

The present invention relates to improvements to heat insulating means for piping subjected to stresses, whether they are thermal, hydrostatic and/or mechanical and the positioning of these insulating means on said piping; it further relates to processes for forming these new insulating means.

2. Description of the Prior Art

In offshore oil fields, the production wells are connected to a production platform or to a subsea collector by underwater ducts disposed on the sea bed. It is usual for a production platform (which provides a first treatment of the crude oil) to be connected to several wells, the number thereof depending on a great number of parameters such as the size and yield of the field, depth of water, etc. . . .

The oil leaves these production wells at a variable temperature (70° to 95° C.) sufficient, in any case, for it to flow into the drilling tube.

When it is a question of light oil, it is then brought to the platform by a conventional metal undersea duct and arrives at the production platform at a temperature, which is variable depending on the length of the pipe, between that of the well head and that of the water in the immediate neighborhood of the duct.

Furthermore, in so far as transporting heavy high viscosity oils or paraffin oils by a metal duct is concerned, the oil conveyed by this duct will be progressively brought to the temperature of the sea water. At a certain distance from the well it will become too viscous or solid deposits will appear causing clogging of the duct. It is obvious that the critical distance for the appearance of this phenomen will be all the smaller the lower the temperature of the sea water and, consequently, the greater the depth at which the duct is located.

The problem also arises for gas pipe lines between the wells and the platform where a considerable lowering of the temperature of the gas causes the formation of hydrates and progressive clogging of the duct.

The need for heat insulating the piping so as to protect it as much as possible from the adverse effects of the low temperatures of the sea environment has therefore become imperative for the operators of "offshore" platforms, so as to reduce as much as possible the temperature gradient of the crude oil between its ouput from the drilling well and its arrival at the production platform, so that it remains low, of the order of 5° to 30° C.

The solution proposed in the prior art for providing insulation of underwater piping of this type, is shown by the arrangement of an outer metal sheath which surrounds the remote crude oil collecting pipe line, the gap between the inner collecting piping and the outer metal sheath being filled with a heat insulating material formed from polyurethane foam. However, this solution has considerable drawbacks both in the economical and in the technological spheres. In fact, whereas the inner collecting piping must withstand the internal pressures developed by the flow of crude oil at a relatively high temperature, the outer sheath must withstand hydrostatic crushing pressures to which the sea environment on the sea bed subjects it, so that it must be made from steel and have a relatively high thickness, adapted for withstanding the high pressures to which it is subjected, so that it is very expensive.

The polyurethane foam injected in situ is relatively unresistant to the high hydrostatic pressures which prevail at the bottom of the sea, so that should the outer metal sheath be accidently perforated, the insulating polyurethane foam is destroyed both by the hydrostatic pressure which it must then withstand directly and without protection and by the sea environment which hydrolyses it; injection takes place without the possibility of checking the quality of the insulation formed, so that it may have uncontrolled and uncontrollable insulating defects.

Furthermore, the outer sheath may comprise solutions of continuity or gaps for welding the successive adjacent tubes on the barge, so as to form the heat insulated collecting pipe line desired; it is then neccessary to leave, in the vicinity of the adjacent junction ends of two successive tubes, a non insulated gap of about 40 cm so as to allow welding; after welding the ends of the tubes to each other, the gap between two sheath sections is made up by positioning a sleeve which is welded to the ends of two adjacent sheath sections, so as to obtain a continuous outer sheath, while leaving however an orifice for the in situ injection of the heat insulating polyurethane foam, which orifice is then closed by a welded plug. So as to prevent any alteration of the insulating material by the temperatures used for welding, during the plug welding operation, it is necessary to protect the insulating material by interpositioning asbestos rings.

The operations for positioning the sheath sections about the inner tubes, welding the adjacent ends of the successive inner tubes together, positioning and welding sleeves in the gaps between the adjacent sheath sections, injecting the insulating polyurethane foam in situ and welding so as to close the injection orifices formed in the welded joins between the sleeves and the sheath sections, with interpositioning of asbestos rings, must furthermore necessarily be carried out on the barge before lowering the piping with its insulating device, to the sea beds on which it is to be laid. The time during which the barge is immobilized on the site is therefore relatively long before the insulated piping effectively connects a drilling well to a production platform, and greatly increases the cost price for laying such heat insulated piping.

It has also been proposed in the prior art to provide piping for transferring the crude oil from the wells to the offshore production platform with an outersheath formed by a tube made from a rigid plastic material such as PVC or polyethylene, the gap between such an outer sheath and the piping being filled with a heat insulating material such as polyurethene foam.

However, this solution is not satisfactory either for the resistance of the outer rigid PVC or polyethylene sheath is insufficient with respect to the hydrostatic crushing pressures which reign in the sea at great depths, more especially greater than 50 meters; in addition, the jointing operations are just as complicated as in the case where the outer sheath is made from steel; furthermore, for laying, repairing and facing up to the consequences of possible damage, problems are met with similar to those which have been set forth above in connection with the heat insulating system formed by polyurethane foam interposed between the piping and the outer rigid plastic material sheath.

SUMMARY OF THE INVENTION

The present invention therefore provides means for heat insulating piping subjected to considerable thermal, hydrostatic and mechanical stresses which answer better the requirements of practice than the heat insulating means proposed by the prior art for the same purpose, more especially in that they allow very rapid joining, on the barge, not only of successive tubes for forming a pipe line, but also insulating means associated with the tubes for filling the gaps between the adjacent tubes to be joined together, in that the heat insulating means have not only excellent insulating properties, but also an excellent resistance to the hydrostatic crushing pressures to which they are subjected on the sea bed, in that, because of the speed of the jointing operations, the barge is immobilized on the laying site for a shorter time, thus considerably reducing the costs involved in positioning piping on the sea bed, in that the heat insulation of the invention is sealed and resistant to the sea environment, so that it is not likely to cause an accidental inrush of sea water and practically does away with the risks of damage related to such an accidental inrush and in that local repairs which the heat insulation may possibly require are relatively easy to carry out because the risk of said insulation being swamped by sea water has been eliminated.

The present invention relates to a heat insulating means for piping subjected to high thermal, hydrostatic and mechanical stresses, comprising a plurality of sectors made from a foam insulating material enclosing air, which sectors or layers are bonded together by foils or layers of elastomer, which have been cured at a temperature less than or equal to 120° C.

In an advantageous embodiment of the insulating means of the invention, the insulating material is formed by rigid PVC foam having closed cells. In another advantageous embodiment of the insulating means of the present invention, the insulating material is a syntactic material formed by spheres of PVC foam having closed cells coated with an epoxy resin based matrix whose thermal conductivity is lowered by the addition of glass microballs.

In yet another advantageous embodiment of the insulating means of the present invention, the insulating material is formed by a syntactic material comprising glass microballs and plastic material balls embedded in an epoxy resin matrix.

In yet another advantageous embodiment of the insulating means of the present invention, the elastomer used as shock absorbing material and at the same time as bonding material for the layers or sectors of insulating material is rubber lightened by glass microballs which are embedded in a rubber matrix.

In yet another advantageous embodiment of the thermal insulating means of the present invention, they are formed by an insulating laminated material which is formed from a plurality of layers of a foam insulating material enclosing air and rubber layers, which laminate is homogeneous, unpeelable, sealed, resistant to high hydrostatic pressures, resistant to corrosion, to abrasion and to shocks.

In an advantageous arrangement of this embodiment, the foam insulating material from which the insulating material layers are formed is rigid PVC foam with closed cells.

In another advantageous arrangement of this embodiment, the foam insulating material from which the insulating material layers are formed comprises balls of PVC foam with closed cells incorporated in an epoxy resin based matrix, or is formed from an epoxy resin matrix in which the glass microballs and balls made from an appropriate plastic material are embedded.

In yet another advantageous arrangement of this embodiment, the external layers of the laminate are rubber or lightened rubber layers.

According to another advantageous embodiment of the thermal or heat insulating means of the present invention they are formed by sectors made from an insulating material bonded together by elastomer foils.

The present invention also relates to a device for the heat insulation of undersea ducts subjected to high thermal, hydrostatic and mechanical stresses which comprises, in combination: a first elastomer layer which surrounds the duct to be insulated and thus ensures the anti corrosion protection thereof; the heat insulating means such as defined above, superimposed continuously on said first layer; a second elastomer layer, sea water tight and abrasion resistant, which surrounds the heat insulating means, said insulating layers and means protect each tube of a duct to the exclusion of the ends thereof, which are left without protection so as to allow the adjacent tubes to be welded together end to end; a rapid and sealing jointing means for the insulating devices of two adjacent tubes, formed by a ring or shells prefabricated from elastomer which may incorporate elements of a material which is thermally insulating and resistant to the hydrostatic pressure, after welding of the metal tubes, in the corresponding end zones of said tubes, not comprising any insulating devices, and fixed to the adjacent insulating devices of said tubes by means of a sealing elastomer or similar more especially a self curing elastomer, so as to reconstitute the continuity of the insulation of the ducts, or of a heat retractable sheath.

In an advantageous embodiment of the jointing means of the invention, they are formed by a longitudinal split elastomer ring or by two elastomer half shells, the ring or the half shells being reinforced by means of a foam material strip for limiting the heat flow in said jointing device.

In another advantageous embodiment of the jointing means of the present invention, they comprise metal inserts for hooking or fastening said jointing means.

In an advantageous arrangement of this embodiment, the metal inserts are fitted into said elastomer ring so as to be solid on the one hand with the first elastomer anticorrosion layer and on the other with said elastomer ring.

In yet another advantageous embodiment of the jointing means of the invention, the sealing elastomer which interconnects the jointing means with the adjacent heat insulating devices mounted on successive tubes welded axially one to another, is provided at least in the welded zone, without insulating devices, of the ducts, and a sheath made from a material adapted for exerting on the sealing elastomer a compression force for further improving the bonding and plugging properties of said elastomer on the adjacent ends of the successive welded tubes, initially deprived of any insulating device.

In yet another advantageous embodiment of the jointing means of the invention, the external zone where the elastomer jointing ring is secured to the adjacent heat insulating devices is protected by a sealed protecting sheath adhering to said zone.

In a further advantageous embodiment of the heat insulating device of the present invention, the first anti corrosion elastomer layer and the second sealed protecting elastomer layer form an integral assembly with the heat insulating means.

The present invention further provides a process for positioning such a heat insulating and sealed jointing device for adjacent heat insulation devices, on ducts or piping formed by metal tubes welded end to end, wherein an elastomer layer, intended to protect the surface of the metal tubes which are to form the undersea ducts to be insulated from corrosion, is positioned on the outer surface of said tubes, by any appropriate means and more especially by winding or "taping" so as to leave the ends of said tubes free over a short distance; -then a heat insulating means comprising a plurality of sectors or layers made from a foam insulating material enclosing air, bonded together by means of elastomer foils or layers, which heat insulating means has, prior to its positioning, been subjected to low temperature curing, lower than or equal to 120° C., for curing the elastomer bonding foils or layers, is positioned by any appropriate means on the elastomer layer protecting against corrosion; a second insulating elastomer layer is positioned, by any appropriate means, and more especially by winding or "taping" on the above mentioned heat insulating means—and, after the successive metal tubes have been welded end to end, the welding zone, deprived of heat insulating devices, of said tubes is filled so as to ensure the continuity of the heat insulation over the whole of the length of the duct, by using a jointing means formed preferably by a prefabricated ring or sectors made from elastomer in which strips of a foam insulating material enclosing air are incorporated, whose purpose is to limit the heat flow, which jointing means is sealingly fixed, on the one hand, to said welding zone and to the ends of the anticorrosion elastomer layer of the insulating means carried by two adjacent welded tubes, by means of a self curing elastomer, or mastic, and on the other hand to the bonded elastomer walls which encapsulate the heat insulating material of the heat insulation means.

In a preferred embodiment of this process, the self curing elastomer which provides sealed bonding of the jointing means in said welding zone, is associated with a sheath made from a material capable, under certain conditions, of exerting compression forces on said elastomer, which improve its bonding and sealing properties.

In another preferred embodiment of this process, the outer jointing zone of the means for jointing adjacent heat insulating devices together is protected by a sheath made from a material capable, under some conditions, of exerting compression forces of said zone so as to improve the bonding and sealing properties of the self curing elastomer which fixes the ends of the jointing means to the corresponding ends of the adjacent heat insulation devices.

In yet another preferred embodiment of this process, the jointing ring is provided with metal hooping inserts.

In yet another preferred embodiment of this process, the jointing ring is provided with metal inserts for fixing said ring to the heat insulating device, which meal inserts are fixed, by stapling, clipping or similar, to the anti corrosion elastomer layer of the heat insulating device.

In yet another preferred embodiment of this process, the anti corrosion elastomer layer and the insulating elastomer layer which cover the heat insulating means form an integral part of said means, that is to say that they form one therewith.

In a preferred embodiment of the process of the invention, the heat insulating means is formed by a laminate which is formed from a plurality of layers of a foam insulating material enclosing air, bonded together by elastomer foils which are curable at a temperature less than or equal to 120° C., which laminate may comprise outer elastomer layers bonded to the insulating material layers and which play respectively the role of anti corrosion layer and external sealing and protection layer during positioning of said laminate on a tube to be insulated, and said laminate is wound on the tube to be insulated with an appropriate pitch.

In an advantageous arrangement of this embodiment, a plurality of strips of a foam insulating material enclosing air is formed by winding with a pitch such that there is provided between two successive strips a free space in which the bonding elastomer is inserted, such a laminate having very great flexibility which depends on the width of the gap which separates the two consecutive turns.

In another preferred embodiment of the process of the invention, the heat insulating means are formed by a plurality of sectors made from a foam insulating material enclosing air bonded together radially or laterally by means of an elastomer layer.

Whether in the form of a laminate or sectors bonded together by elastomer, the heat insulating means are advantageous prefabricated for fitting onto each of the tubes to be insulated, while leaving the ends thereof free of any heat insulating means, for welding them to adjacent tubes.

In yet another preferred embodiment of the process of the present invention, the jointing means are formed by a prefabricated elastomer ring obtained by molding.

In another preferred embodiment of the process of the present invention, the elastomer ring which forms the jointing means is obtained by successively winding, on a mandrel, strips of a foam insulating material enclosing air and elastomer strips, then curing the assembly at a temperature less than or equal to 120° C.

In yet another preferred embodiment of the process of the present invention, the jointing means are fixed to the welded zones of the tubes, with out heat insulating devices, by a self curing elastomer which is provided with a retractable material sheath, made more especially from heat retractable polyethylene, which in the retracted state, exerts compression forces on the self curing elastomer which are such that this latter adheres strongly on the one hand to the underlying welding zone and on the other to the anti corrosion elastomer layers which surround said welding zone, so as to anchor the jointing means.

The present invention relates more particularly to the means and devices for thermally insulating piping, in accordance with the preceding arrangements, the devices for jointing said heat insulating means, as well as the processes for producing same, the processes for positioning same and the piping thermally insulated by using the heat insulating and jointing devices and means of said insulating devices.

Besides the above arrangements, the invention further provides other arrangements which will be clear from the following description.

BRIEF DESCRIPTION OF THE DRAWINGS

The invention will be better understood from the following complement of description which refers to the acompanying drawings in which:

FIG. 1 shows schematically a heat insulating device according to the invention, seen in partial longitudinal section, mount on a tube to be insulated;

FIGS. 2, 3, 5 and 7 show the embodiments of heat insulating devices in accordance with the present invention in partial schematical cross sectional views;

FIG. 4 is a partial longitudinal sectional view of a jointing means positioned in the welding zone of two tubes welded end to end and fixed to the adjacent insulating devices carried by the two tubes;

It should however be understood that these drawings and the corresponding descriptive parts are given solely by way of illustration of the subject of the invention, of which they in no wise form a limitation.

DESCRIPTION OF THE PREFERRED EMBODIMENTS

The heat insulating device in accordance with the invention comprises an elastomer layer 2 whose purpose is to protect the metal tube 1 to be insulated from corrosion, a layer 3 made from a foam insulating material enclosing air and a second elastomer layer 4 which protects the insulating material layer 3.

Figure 7:
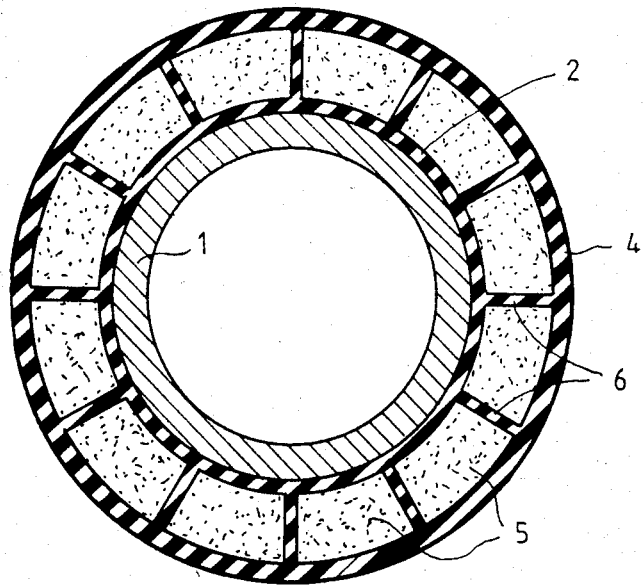

Preferably, the elastomer used for forming layers 2 and 4 is, for example, polychloroprene which, is applied in layers of five to seven millimeters and seven to ten millimeters in thickness, respectively, on the one hand on tube 1 and on the other on the insulating layer 3. The insulating device designated generally by the reference 10 in FIG. 1 may be formed in different ways: it may be formed by insulating material sectors 5 bonded together by rubber 6 (see FIGS. 2, 5 and 7), or by a laminate comprising sheets 7 of an insulating material bonded together by thin rubber sheets 8 (see FIGS. 3 and 8). In particular, the insulating device is formed by winding insulating material sheets whose thickness is of the order of 5 to 8 mm, bonded together by rubber sheets from one to two millimeters in thickness.

The heat insulating means are preferably formed by sectors 5 or sheets 7 of rigid polyvinyl chloride foam with closed cells or from syntactic material comprising polyvinyl chloride foam spheres encased in an epoxy resin based matrix or comprising glass microballs associated with plastic material balls embedded in the epoxy resin.

The insulating material formed by sectors 5 or sheets 7 bonded together by rubber of a similar elastomer is cured, before positioning about tubes 1, at a temperature less than or equal to 120° C., preferably between 80° and 100° C., which the insulating material withstands well (and particularly "KLEGECELL"), and provides a homogeneous cured product, withstanding high pressures, which does not peel and which has excellent heat insulating properties while withstanding well the hydrostatic pressures of the surrounding sea environment, which are themselves transmitted to the metal tube to be insulated.

The elastomer for bonding together elements 5 or 7 which form the heat insulating means is preferably rubber of any composition, appropriate for the desired purpose. However, a bonding rubber may be used formed from a lightened rubber in which glass microballs are embedded in rubber.

In the variant shown in FIG. 5, a layer 9 of rubber lightened by glass microballs is inserted between the anti corrosion elastomer layer 2 and the insulating material layer 5 or 7, the purpose of this layer 9 being to improve the resistance of the heat insulating means of the invention to temperatures greater than 80° C. of the fluids which flow in the ducts.

As shown in FIG. 1, the heat insulating device 10 is placed about a metal tube 1 to be insulated so that the anti corrosion elastomer layer 2 leaves the ends 11 of said tube 1 free over a length of about 30 cm (with respect to a length, for example of 12 m for the tube) so as to allow subsequent welding together of the metal tubes placed end to end.

After end to end welding of two adjacent tubes 1, the welding zone 12 without heat insulating device defines, with the corresponding ends 13 of the heat insulating means of the invention, an empty space 14 intended to receive a jointing means which comprises an elastomer ring 15 in which is included at least one strip 16 of the above mentioned insulating material such as "KLEGECELL" more particularly, whose role is to limit the thermal flow.

Figure 8:
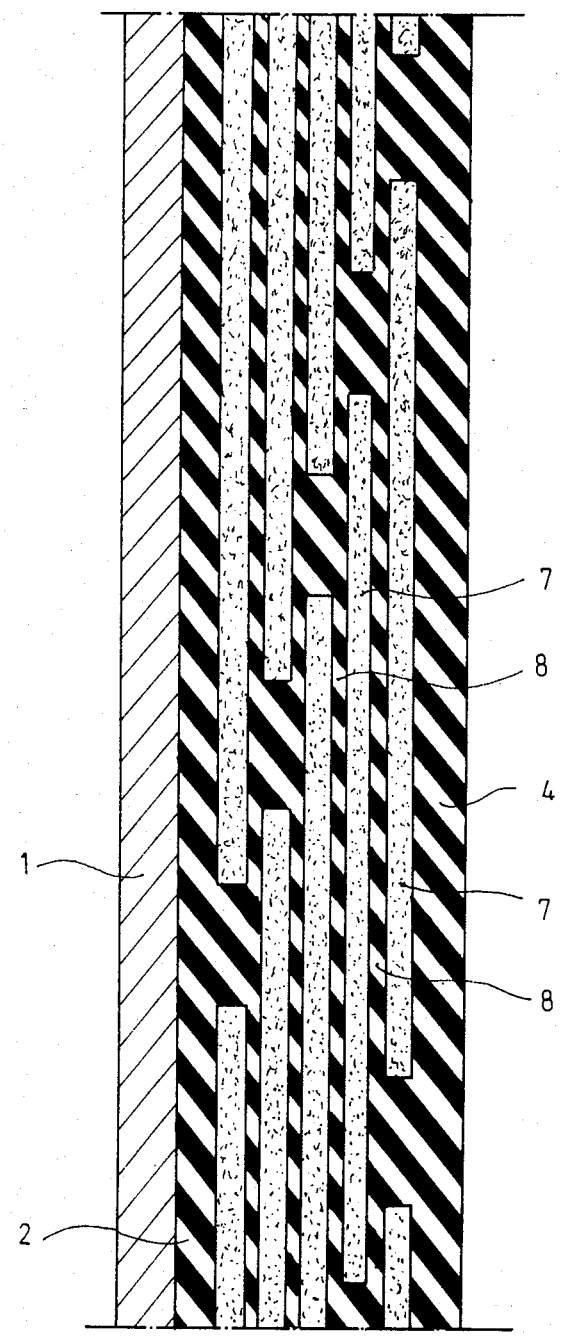
FIG. 8 is a partial longitudinal sectional view of a heat insulating device in accordance with the invention.

Ring 15 is advantageously prefabricated and may be formed by molding or successively and alternatively winding insulating material 16 and rubber strips (of FIG. 8). Ring 15 is advantageously split longitudinally.

Fixing thereof in space 14 is preferably achieved by using a layer 17 of butyl mastic or a similar self curing rubber, which provides adherence and sealing of ring 15 at the corresponding ends 13 of the adjacent heat insulating devices which define space 14 with the welding zone 12. Fixing of the internal face of ring 15 in the welding zone 12 and on the ends of the elastomer layer 2 is preferably achieved by means of a butyl mastic layer 18 having a retractable polyethylene sheath 19 which retracts under heating and creates compression forces which are exerted on the butyl mastic 18 for reinforcing its adherence and sealing properties.

In addition, a sealing and protecting sheath 20, preferably made from retractable polyethylene or from another material capable of exerting a compression effort in the jointing zones 21–22, is applied to the zones 21–22.

In the embodiment shown in FIG. 4, metal inserts 23 ensure hooping of ring 15.

Figure 6:
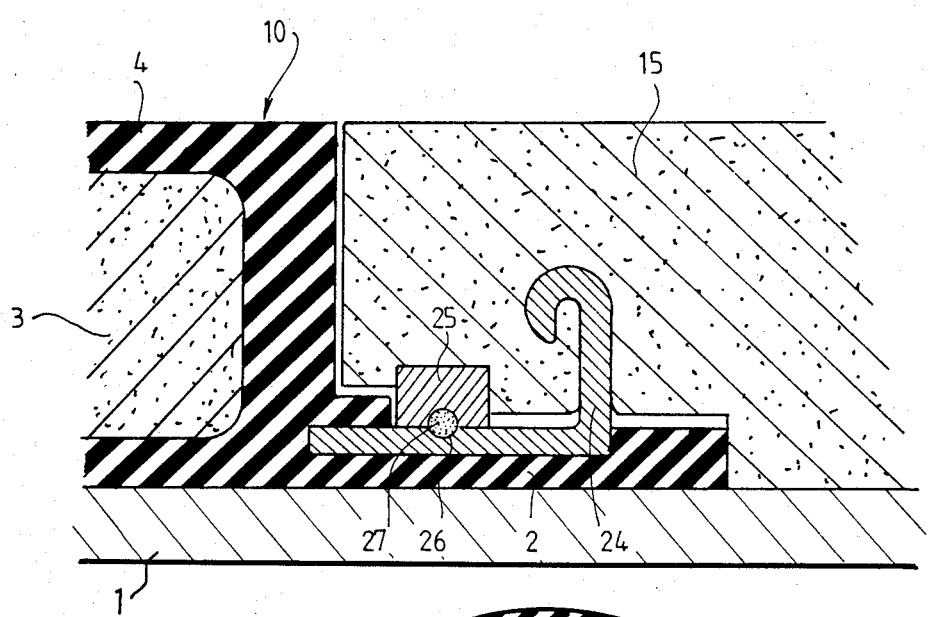
FIG. 6 shows a partial longitudinal sectional view of a means for securing the jointing means of the invention with an adjacent insulating device.

In the embodiment shown in FIG. 6, the metal inserts comprise a hook shaped part 24 which is integral with the anti corrosion elastomer layer 2 and a part 25 integral with ring 15, parts 24 and 25 each comprising a groove which face each other, the two grooves where joined together forming the channel 26 which is filled with butyl mastic 27 so as to firmly secure together the metal insert parts 24 and 25 and to fix ring 15 in position in space 14.

The heat insulating device according to the present invention may be fitted, either in the factory or on the barge, onto the tubes to be insulated and the prefabricated jointing means may be mounted and fixed very rapidly, after end to end welding of adjacent tubes on the barge, for example within five to seven minutes, because of the design of these devices and means.

The heat insulating device according to the present invention, besides withstanding high hydrostatic pressures, as was mentioned above, because of its outer elastomer sheath, provides perfect sealing with respect to sea water, excellent abrasion resistance, and a reliability such that its lifespan may be reckoned at 25 years on average. In addition, the heat insulating device of the present invention withstands the hydrostatic pressures which are exerted at undersea depths greater than 200m and reaching 400m and more; it further provides perfect heat insulation of the fluid which flows in the ducts, since this fluid, whose input temperature may be of the order of 95° C., arrives on the platform at a temperature substantially equal to the input temperature, since the maximum temperature drop observed does not exceed 5° C.

Thus, as is clear from the foregoing, the invention is in no wise limited to those of its modes of implementation, application and embodiments which have just been described more explicitly; it embraces on the contrary all the variants thereof which may occur to a technician skilled in the matter, without departing from the scope or spirit of the present invention.

What is claimed is:

1. A heat insulating device for undersea ducts subjected to thermal, hydrostatic and mechanical stresses, comprising, in combination:
   a first elastomer layer, which surrounds a duct to be insulated and comprising a plurality of metallic and rigid tubes intended to be assembled end to end, thus providing anti-corrosion protection therefor;
   heat insulating means made from a foam insulating material enclosing air and withstanding high hydrostatic pressures, which are superimposed continuously on said first layer;
   a second sea-water tight elastomer layer, resistant to abrasion, which surrounds said heat insulating means;
   a plurality of radially projecting elastomer layers regularly disposed around the periphery of said duct and interconnecting said first and second elastomer layers, in order that said insulating device comprises a plurality of sectors filled with said heat insulating means which are bonded together by said radially projecting elastomer layers,
   wherein said device protects each tube of said duct to the exclusion of the ends of said tube which are left without protection so that adjacent tubes may be welded together end to end;
   a rapid jointing and sealing means for the insulating devices of two adjacent tubes, after welding of the metal tubes in the corresponding end zones of said tubes free of insulating devices, wherein rapid jointing and sealing means comprise a prefabricated elastomer ring which incorporates heat insulating and hydrostatic pressure resisting material elements, and is fixed to the adjacent insulating devices of said tubes by means of a member selected from the group consisting of sealing elastomer, a self curing elastomer, and of a thermal retractable sheath, so as to constitute between adjacent devices a zone for continuing the insulation.

2. A heat insulating device for undersea ducts subjected to thermal, hydrostatic and mechanical stresses, comprising, in combination:
   a first elastomer layer, which surrounds a duct to be insulated and comprising a plurality of metallic and rigid tubes intended to be assembled end to end, thus providing anti-corrosion protection therefor;
   heat insulating means made from a foam insulating material enclosing air and withstanding high hydrostatic pressures, which are superimposed continuously on said first layer;
   a second sea-water tight elastomer layer, resistant to abrasion, which surrounds said heat insulating means;
   a plurality of thin cylindrical intermediate elastomer layers disposed between said first and second elastomer layers, in order that said insulating device consists of a laminate comprising a plurality of insulating sheets, made of said heat insulating means, bonded together by said intermediate elastomer layers, said laminate being unpeelable, resistant to high hydrostatic pressures, resistant to corrosion, to abrasion and to impacts, which device protects each tube of said duct to the exclusion of the ends thereof which are left without protection for welding adjacent tubes together end to end;
   a rapid jointing and sealing means for the insulating devices at two adjacent tubes, after welding of the metal tubes in the corresponding end zones of said tubes free of insulating devices, wherein rapid jointing and sealing means comprise a prefabricated elastomer ring which incorporates heat insulating and hydrostatic pressure resisting material elements and is fixed to the adjacent insulating devices of said tubes by means of a member selected from the group consisting of sealing elastomer or a self-curing elastomer, or of a thermal retractable sheath, so as to constitute between adjacent devices a zone for continuing the insulation.

3. The insulating means as claimed in claim 1 or 2, wherein said elastomer layers are lightened by hollow glass microballs which are embedded in a rubber matrix.

4. The insulating means as claimed in claim 1 or 2, wherein said foam insulating material is formed of balls or PVC foam with closed cells incorporated in an epoxy resin based matrix.

5. The insulating device as claimed in claim 1 or 2, wherein said zone is protected by protecting and sealing sheaths adhering to said zone.

6. The insulating means as claimed in claim 1 or 2, wherein said insulating material is formed of rigid PVC foam with closed cells.

7. The insulating means as claimed in claim 1 or 2, wherein said insulating material is a syntactic material formed by PVC foam spheres with closed cells embedded in an epoxy resin based matrix whose thermal conductivity is lowered by the addition of glass microballs.

8. The insulating means as claimed in claim 1 or 2, wherein said insulating material is formed of a syntactic material comprising glass microballs and balls made from a plastic material, embedded in an epoxy resin matrix.

9. The insulating means as claimed in claim 1 or 2, wherein said foam insulating material is formed of an epoxy resin matrix which includes glass microballs and balls of an appropriate plastic material.

10. The heat insulating device as claimed in claim 1 or 2, wherein said jointing means is formed by a longitudinally split elastomer ring or by two elastomer half shells, reinforced by at least one strip of foam material whose purpose is to limit the thermal flow in said jointing device.

11. The insulating device as claimed in claim 1 or 2, wherein said jointing means comprises metal inserts for hooping or fixing said jointing means.

12. The insulating device as claimed in claim 11, wherein said metal inserts are mounted in said elastomer ring so as to be firmly secured on the one hand to the first elastomer anti corrosion layer and on the other to said elastomer ring.

13. The insulating device as claimed in claim 1 or 2, wherein said sealing elastomer which fixes the jointing means mounted on successive tubes welded axially to each other, is provided, at least in the welded zone of said ducts free of insulating devices, with a sheath made from a material capable of exerting, on the sealing elastomer, a compression force such as to further improve the adherence and plugging properties of said elastomer on the adjacent ends on the successive welded tubes, initially free of insulating device.

* * * * *